(12) United States Patent
Eugster et al.

(10) Patent No.: US 8,800,897 B2
(45) Date of Patent: Aug. 12, 2014

(54) PROCESS AND DEVICE FOR PRODUCING FLOUR

(75) Inventors: Walter Eugster, Niederuzwil (CH); Stephen Weinmann, St. Gallen (CH)

(73) Assignee: Bühler AG, Uzwil (CH)

( * ) Notice: Subject to any disclaimer, the term of this patent is extended or adjusted under 35 U.S.C. 154(b) by 429 days.

(21) Appl. No.: 13/086,986

(22) Filed: Apr. 14, 2011

(65) Prior Publication Data

US 2011/0278383 A1    Nov. 17, 2011

Related U.S. Application Data

(60) Provisional application No. 61/324,462, filed on Apr. 15, 2010.

(51) Int. Cl.
*B02B 5/00* (2006.01)

(52) U.S. Cl.
USPC .............. 241/6; 241/7; 241/8; 241/9; 241/10

(58) Field of Classification Search
USPC ...................................... 241/6–10
See application file for complete search history.

(56) References Cited

U.S. PATENT DOCUMENTS

| | | | | |
|---|---|---|---|---|
| 4,913,804 A | * | 4/1990 | Muller | 209/44.2 |
| 5,186,968 A | * | 2/1993 | Wellman | 426/483 |
| 5,211,343 A | * | 5/1993 | Wellman | 241/86.1 |
| 5,650,018 A | * | 7/1997 | Muller | 134/25.3 |
| 6,217,442 B1 | | 4/2001 | Schmidt | |
| 2007/0264413 A1 | | 11/2007 | Binder et al. | |
| 2008/0260922 A1 | * | 10/2008 | Kirkpatrick et al. | 426/331 |
| 2008/0263922 A1 | * | 10/2008 | Ho et al. | 40/508 |
| 2008/0311274 A1 | | 12/2008 | Xu et al. | |
| 2009/0169707 A1 | * | 7/2009 | Ito et al. | 426/622 |
| 2010/0021611 A1 | * | 1/2010 | Yates et al. | 426/555 |

FOREIGN PATENT DOCUMENTS

| | | |
|---|---|---|
| DE | 2410122 | 9/1975 |
| DE | 102007055350 | 5/2009 |
| EP | 0801984 | 5/2000 |
| EP | 2269739 | 1/2011 |

* cited by examiner

*Primary Examiner* — Shelley Self
*Assistant Examiner* — Onekki Jolly
(74) *Attorney, Agent, or Firm* — Shoemaker and Mattare

(57) ABSTRACT

Whole grain flour is produced from a cereal grain such as wheat by removing an outer layer of the grain, and also some of the endosperm. The removed outer layer comprises 5% to 40% of the original weight of the grain. The removed parts of the grain are comminuted during the removal of the outer layer. Both the grain and the comminuted removed outer layer are then conveyed into a milling device and are milled to form whole grain flour.

14 Claims, 9 Drawing Sheets

PROCESS AND DEVICE FOR PRODUCING FLOUR

Figure 1:
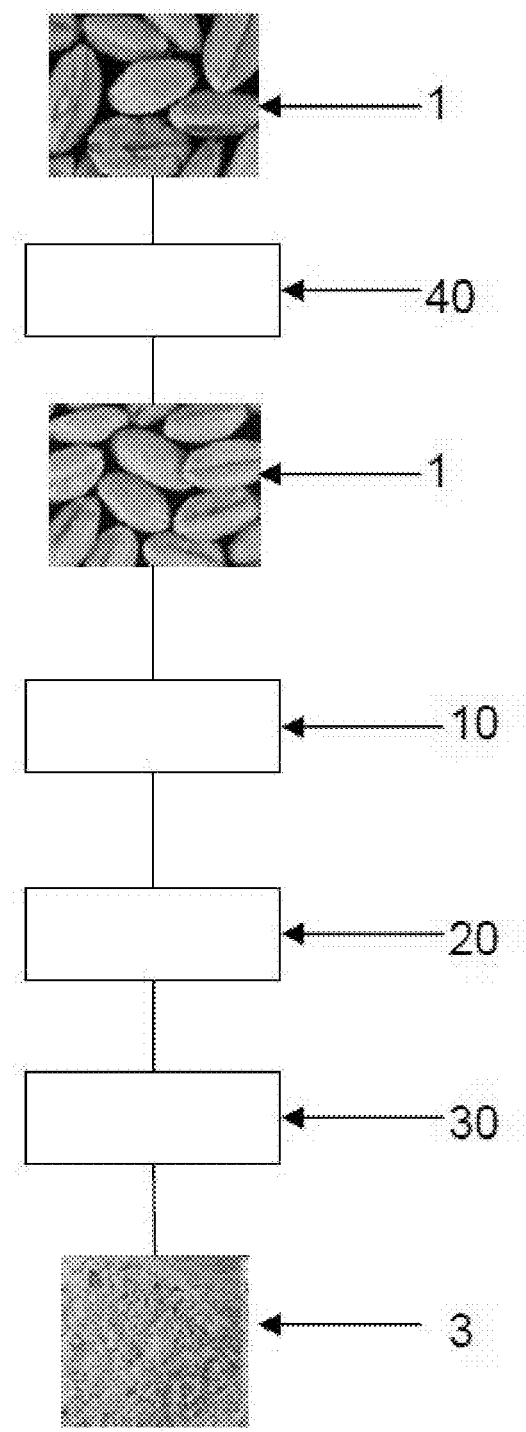

This application claims benefit of provisional application 61/324462, filed Apr. 15, 2010.

The invention relates to the field of milling, in particular to a process and a system for producing flour from cereal.

The cereal grain, expressed simply, has a triple shell structure. The outer shell layer comprises the outer skin, longitudinal and cross cells and also tube cells. This outer shell layer can make up to 5.5% by weight of the entire grain. The next inner layer is a double layer of what is termed a pigment layer and a colorless layer; for this double layer, a fraction of about 2.5% by weight of the entire grain is assumed. The next inner layer is termed aleurone layer and comprises about 7% by weight of the entire grain. These layers listed to this point are in their entirety also termed bran. In the interior of the grain, the germ may be found (approximately 2.5% by weight of the entire grain), and also the actual flour body, or endosperm, which makes up the remainder to 100% by weight in total.

It is known to produce whole grain flour by the following steps: detaching bran from a cereal grain; separating the detached bran from the cereal grain; separate milling of bran and cereal grain; mixing milled bran and cereal flour.

In addition, US 2009/0169707 A1 discloses the production of whole grain flour, wherein, in a first step, a coarse milling of a cereal grain is performed, then this milling product is separated into a coarse fraction and a fine fraction and the coarse fraction is subsequently milled. Then, the original fine fraction is mixed with the remilled coarse fraction.

These previously known processes have the disadvantage that they are complex in terms of apparatus, since separation of at least two fractions, separate milling thereof and also subsequent mixing thereof are necessary. This leads to high costs and in addition to a high energy consumption per unit weight of the flour that is to be produced.

The object of the invention is to avoid the disadvantages of these previously known processes and, in particular, to provide an alternative process and also a corresponding device for flour production which are less complex in terms of apparatus and thereby cheaper, and the energy consumption of which for producing flour, in particular whole grain flour, per unit weight, is reduced compared with the prior art.

This object is achieved by the subjects of the independent patent claims.

The process according to the invention for producing flour, in particular whole grain flour, from cereal, in particular from wheat, comprises a plurality of steps. In a first step, there follows the removal of an outer layer of at least one grain, in particular a cereal grain, wherein some of the endosperm is also removed. The removed outer layer comprises 5% by weight to 40% by weight of the grain, based on the grain before the removal, preferably 15% by weight to 30% by weight, particularly preferably 18% by weight to 28% by weight, and very particularly preferably 20% by weight to 25% by weight. These removed parts of the grain are comminuted, in particular during the removal of the outer layer. Then there follows conveying the comminuted removed outer layer and the grain into a milling device and milling the comminuted removed outer layer and the grain, in particular a mixture thereof, in the milling device to form flour, in particular whole grain flour.

The grain conveyed in the milling device is, in the context of the present invention, to be taken to mean the residual grain which remains after the removal of the outer layer from the original grain.

Whole grain, in the context of the present application, is taken to mean, according to the European whole grain definition of the Healthgrain Consortium (www.healthgrain.org), is taken to mean the grain which remains after removal of the inedible components of the grain such as, for example, the outer husk or else impurities. According to this definition, a grain is also taken to mean a whole grain when up to 2% by weight of the grain, based on the grain before removal or elimination, or up to 10% by weight of the bran is removed.

The method according to the invention has the advantage that no separation of the removed outer layer from the grain before the milling to form flour proceeds, and the removed outer layer and the grain can be milled together to form flour, in particular whole grain flour. The process thereby requires a system for flour production which is less complex in terms of apparatus compared with the prior art, because, for example, no separation device for separating the removed outer layer from the endosperm is necessary. In addition, no fine impact mills and other milling and comminution apparatus are necessary, as a result of which the system becomes cheaper. In addition, this process leads to a reduced energy consumption per unit weight of flour compared with the prior art, since the step of separation and subsequent milling of the removed outer layer from the endosperm can be omitted. In addition, the energy consumption is reduced, since the mixture consisting of the comminuted removed outer layer and the grain is milled together and therefore the separate milling of the removed outer layer and the grain can be omitted.

A further advantage of the process according to the invention is an increased yield of flour, in particular whole grain flour. Flour yields of greater than 85% by weight of the grain, based on the grain before removal, are achievable, in particular 85% by weight to 97% by weight.

The outer layer can be removed, for example, using a "Vertikalschleifer BSPB" [BSPB vertical pearler] from Bühler.

The comminuted removed outer layer and the grain, in particular a mixture thereof, can be milled, for example, using a conventional milling device such as, for example, the "Antares" roller mill from Bühler.

Preferably, before the removal of the outer layer of the grain, the grain is decontaminated.

The term "decontamination", in the context of the present application, is taken to mean at least a reduction, and in particular complete elimination, of environmental poisons and/or impurities.

This has the advantage that impurities and/or environmental poisons which adhere to the grain and/or are mixed with the cereal, can be eliminated from the grain and/or from the cereal before the step of removal, and therefore a flour of higher quality can be produced, i.e. having fewer impurities and/or environmental poisons.

The decontamination can comprise at least one of the following steps: sieving out sand and coarse particles; picking out various foreign particles, for example, stones, seeds and shell fragments; the elimination of adhering dirt and/or environmental poisons.

Particularly preferably, the decontamination is performed by means of mechanical elimination of at least some of the outermost layer of the grain.

It is known that, in an outermost layer of the cereal, environmental poisons and/or impurities can be present.

The mechanical elimination of the outermost layer of the grain has the advantage that, in particular, environmental poisons and/or impurities are reliably eliminated thereby. A corresponding process is described, for example, in EP 801 984 B1, and also in EP 09 164 321.3.

Very particularly preferably, the removed outer layer of the grain has a starch fraction of greater than 15% by weight. Preferably, the removed outer layer of the grain has a starch fraction of greater than 20% by weight, particularly preferably greater than 25% by weight, and very particularly preferably greater than 30% by weight.

The content of starch is determined in the context of the invention as specified in the Swiss Food Codex SLMB (2002) chapter 3.6.1.

Especially preferably, the removed outer layer of the grain has a content of total dietary fiber of less than 55%. Preferably the removed outer layer of the grain has a content of total dietary fiber of less than 45%, particularly preferably less than 40%, and very particularly preferably less than 35%.

This has the advantage that, even in the step of removing the outer layer, some of this layer is torn apart, and thereby the subsequent step of milling can be carried out more efficiently, in particular with respect to energy consumption.

The content of total dietary fiber is determined, in the context of the present invention, as specified in AOAC 985.29.

Preferably, the removed outer layer of the grain has a content of total dietary fiber of greater than 5%. Particularly preferably, the removed outer layer of the grain has a content of total dietary fiber of greater than 1%, and very particularly preferably, greater than 0.2%.

This has the advantage of ensuring sufficient removal of the outer layer of the grain for the subsequent milling step.

Particularly preferably, the untreated grain has a water fraction in the range from 9% to 15%. Preferably, the untreated grain has a water fraction in the range from 9.7% to 14%.

This water fraction of the untreated grain has the advantage that the step of removing the outer layer and also the step of grinding can be carried out reliably, efficiently and therefore inexpensively and in an energy-saving manner.

Further preferably, after the step of removing and comminuting the outer layer of the grain, this comminuted outer layer has a mean value of the particle size distribution in the range from 45 µm to 220 µm, preferably in the range from 50 µm to 170 µm, particularly preferably in the range from 60 µm to 110 µm, and very particularly preferably in the range from 65 µm to 80 µm.

The particle size distribution is determined, in the context of the invention, by means of laser diffraction. For this purpose, for example, the apparatus HELOS Sympatec is suitable.

Preferably, after the step of removing and comminuting the outer layer of the grain, 99% of the particles of this comminuted outer layer have a size in the range from 10 µm to 850 µm, preferably in the range from 10 µm to 770 µm, particularly preferably in the range from 10 µm to 670 µm, and very particularly preferably in the range from 10 µm to 400 µm.

Especially preferably, after the step of removing and comminuting the outer layer of the grain, at least some of the removed layer is separated from the mixture, wherein in particular 0.5% by weight to 25% by weight of the grain, based on the grain before the removal, is separated, preferably 0.5% by weight to 10% by weight, particularly preferably 0.5% by weight to 5% by weight, and very particularly preferably 1% by weight to 5% by weight.

This has the advantage that the properties of the flour can be adjusted by this separation, for example with respect to the bran content and/or the optical properties such as the color of the flour.

A further aspect of the invention is directed towards a system for carrying out the abovementioned process. This system comprises, in the product flow direction, a device for removing an outer layer of a grain, in particular a cereal grain, and a device for comminuting the removed outer layer. In particular, the comminution proceeds in the device during the removal. The system is constructed in such a manner that, before milling to form flour, in particular whole grain flour, no separation of components of the comminuted removed outer layer is provided. In addition, the system comprises, in the product flow direction, a conveying device for conveying the removed outer layer and also the grain into a milling device for milling the removed outer layer and the grain to form flour, in particular whole grain flour.

Preferably, the system comprises, in the product flow direction, a decontamination device which is connected upstream of the device for removal.

This system is provided for carrying out the above described process, wherein no separation of the removed outer layer takes place. The system according to the invention therefore has all of the advantages already described above.

An additional aspect of the invention is directed towards the use of a system for carrying out the abovementioned process for producing flour, in particular whole grain flour from cereal, in particular wheat. In the product flow direction, the system comprises a device for removing an outer layer of a grain, in particular a cereal grain, and for comminuting the outer layer, in particular during the removal. Subsequently, the system comprises a conveying device for conveying the removed outer layer and also the grain into a milling device, in which they are then milled. The system is constructed in such a manner that, upstream of the milling to form flour, in particular whole grain flour, no separation of components of the comminuted removed outer layer proceeds.

Preferably, the system does not have an appliance for separating the removed outer layer.

This system is used for carrying out the above described process and therefore has all of the advantages already described above.

Figure 2:
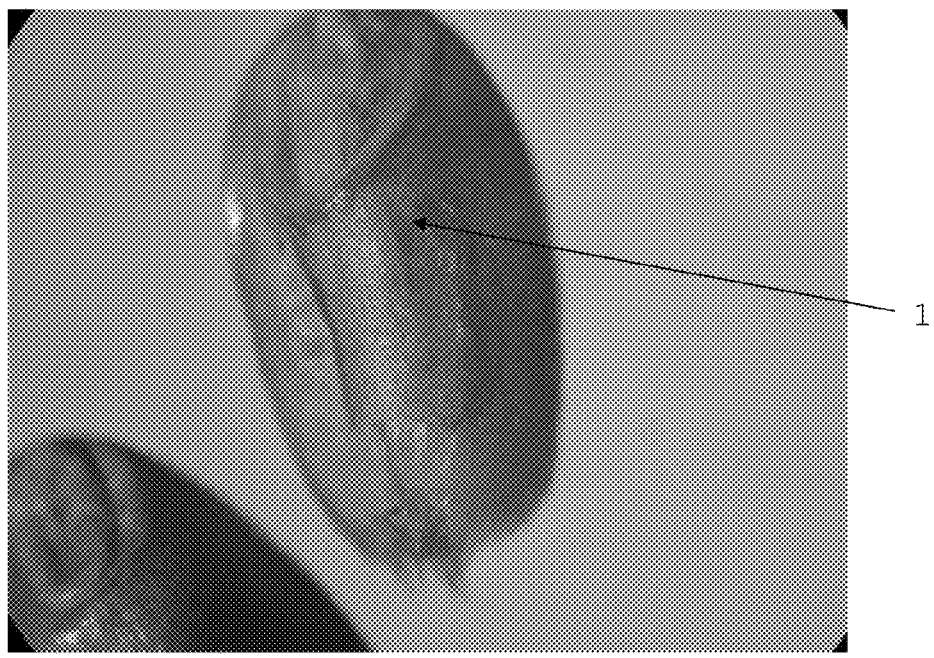
Figure 3:
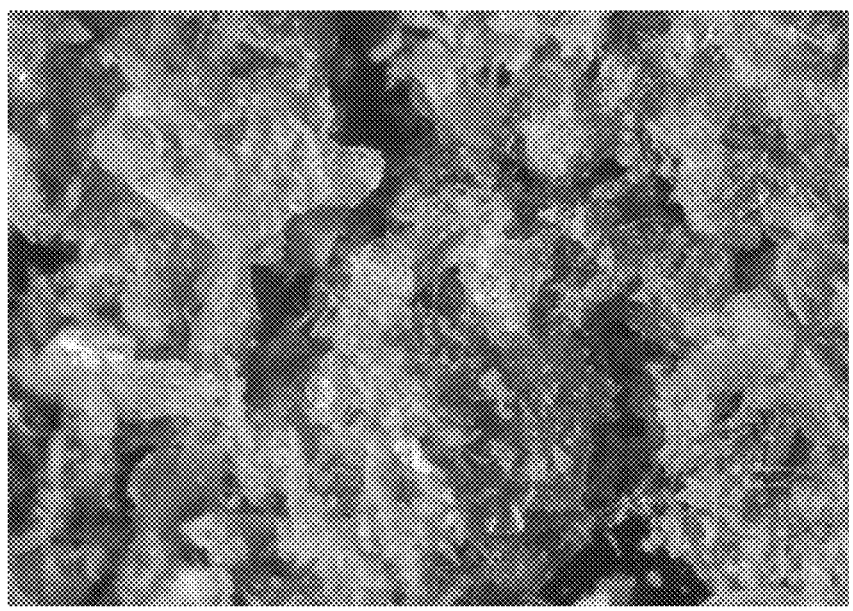
Figure 4:
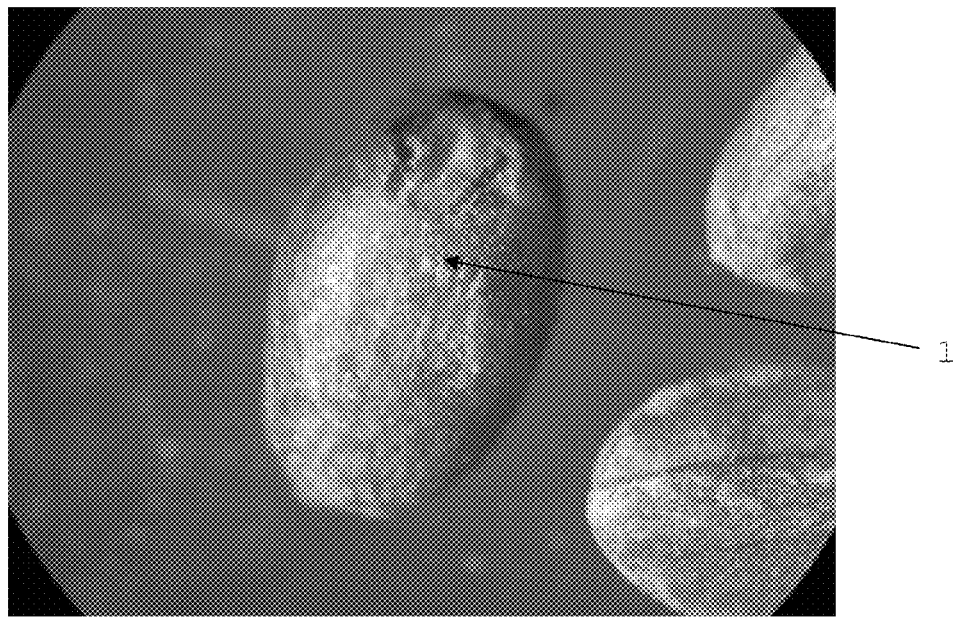
Figure 5:
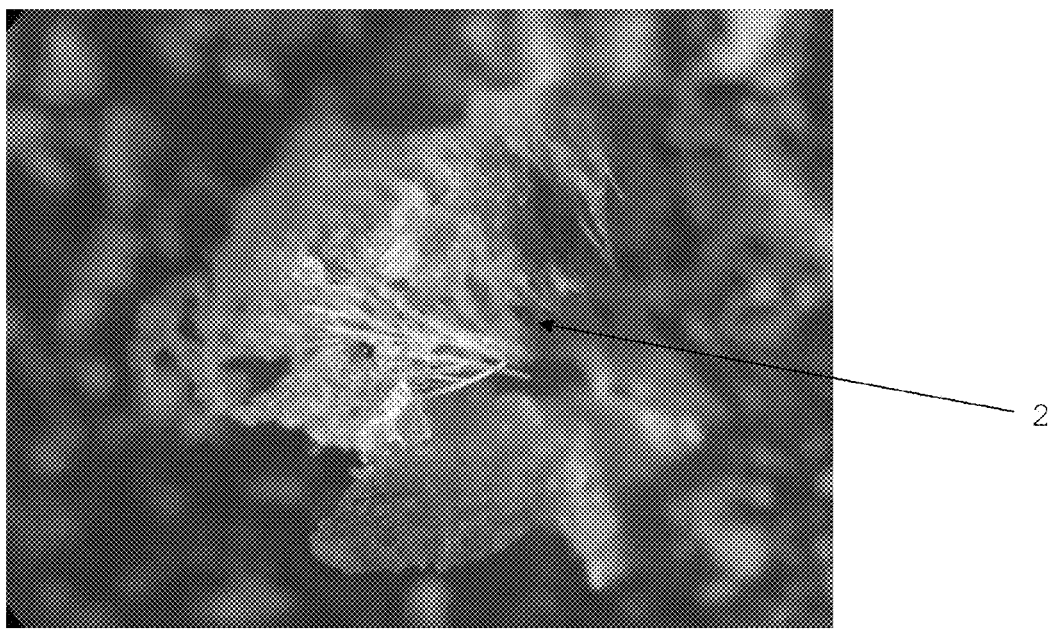
Figure 6:
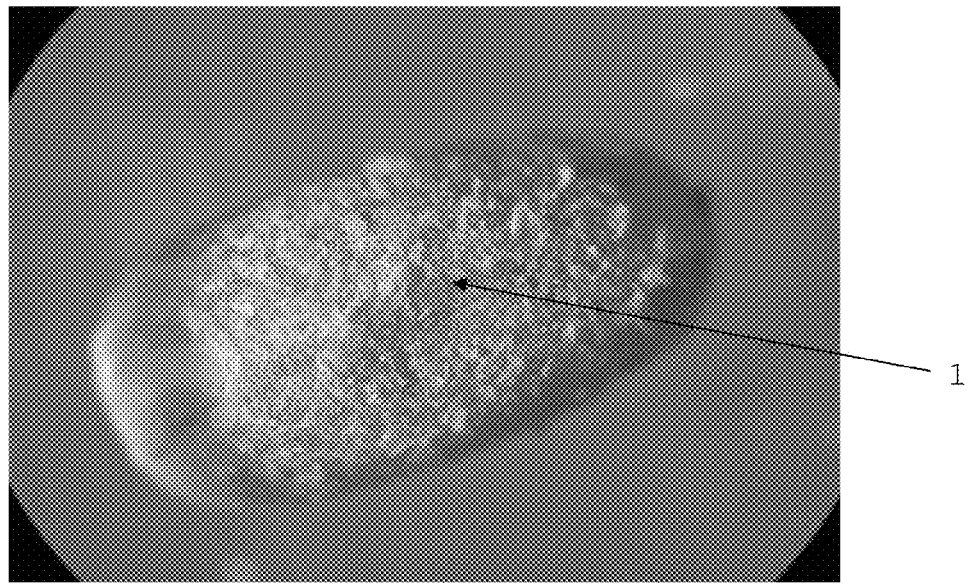
Figure 7:
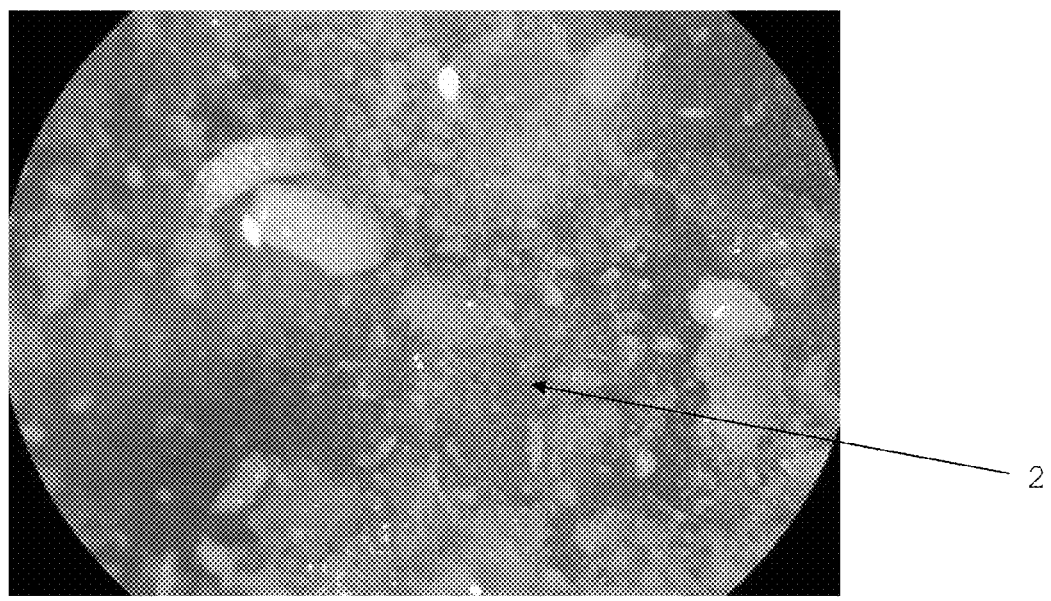
Figure 8:
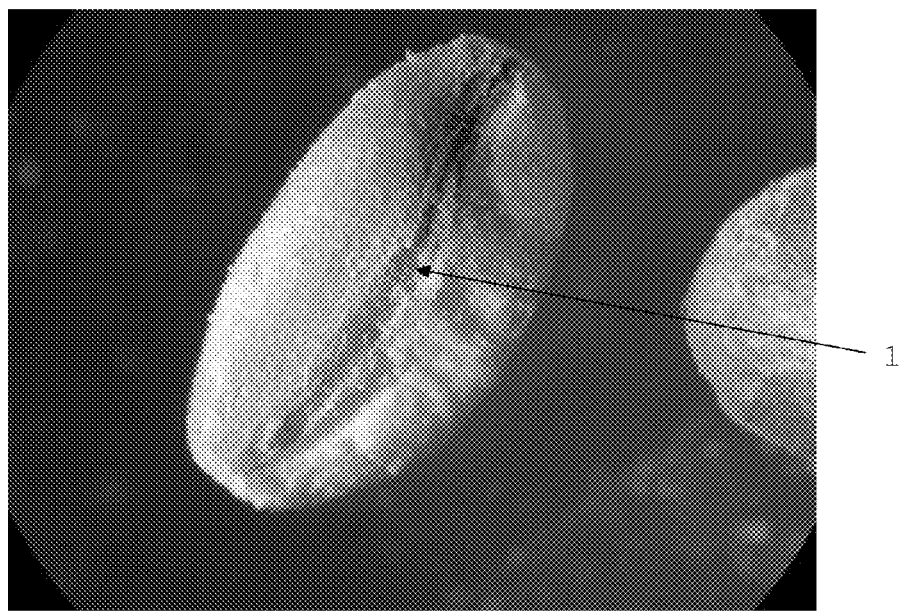
Figure 9:
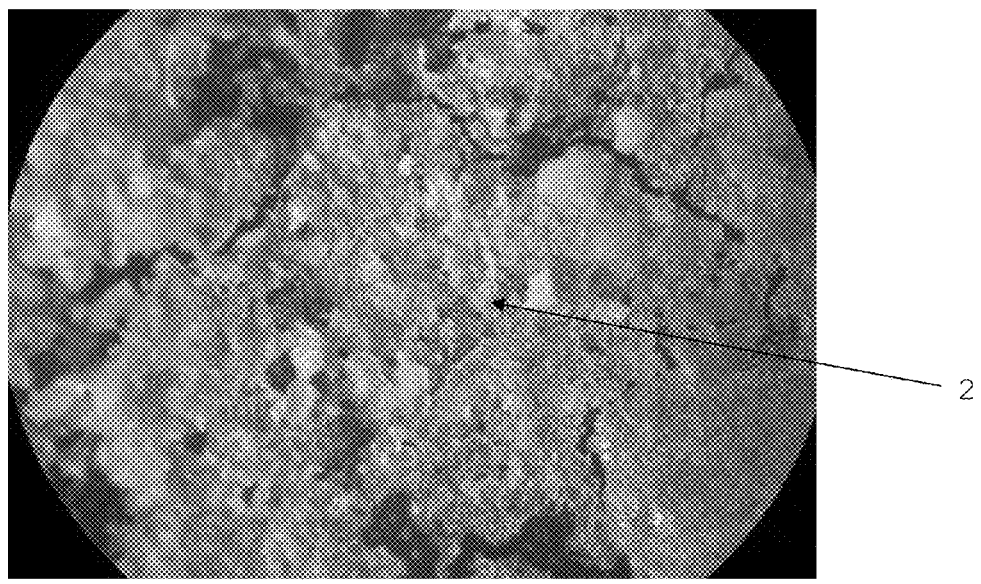
Figure 10:
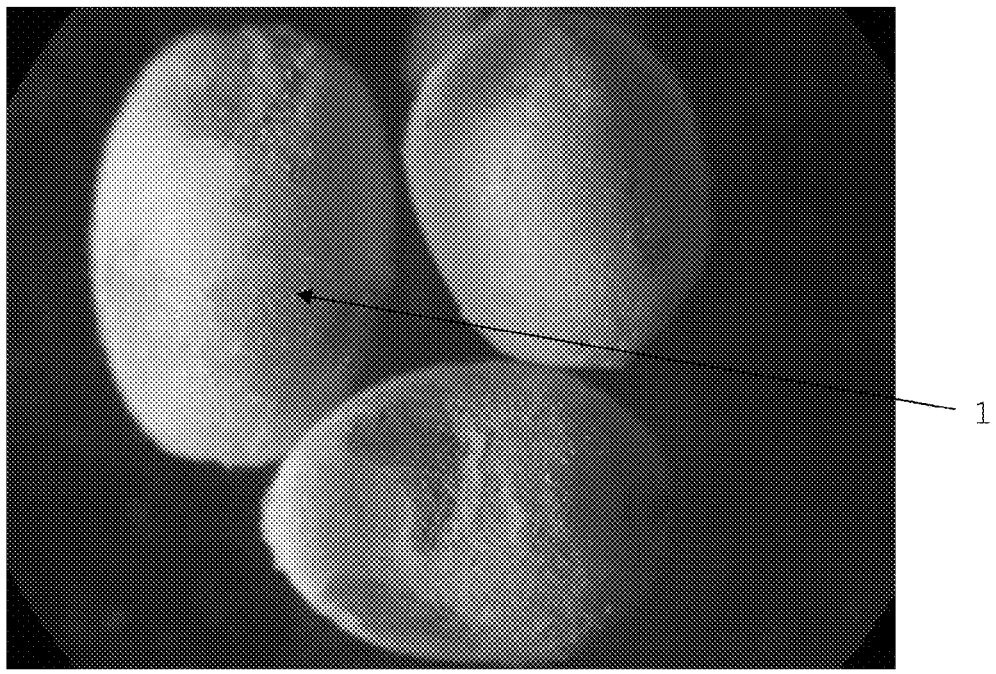
Figure 11:
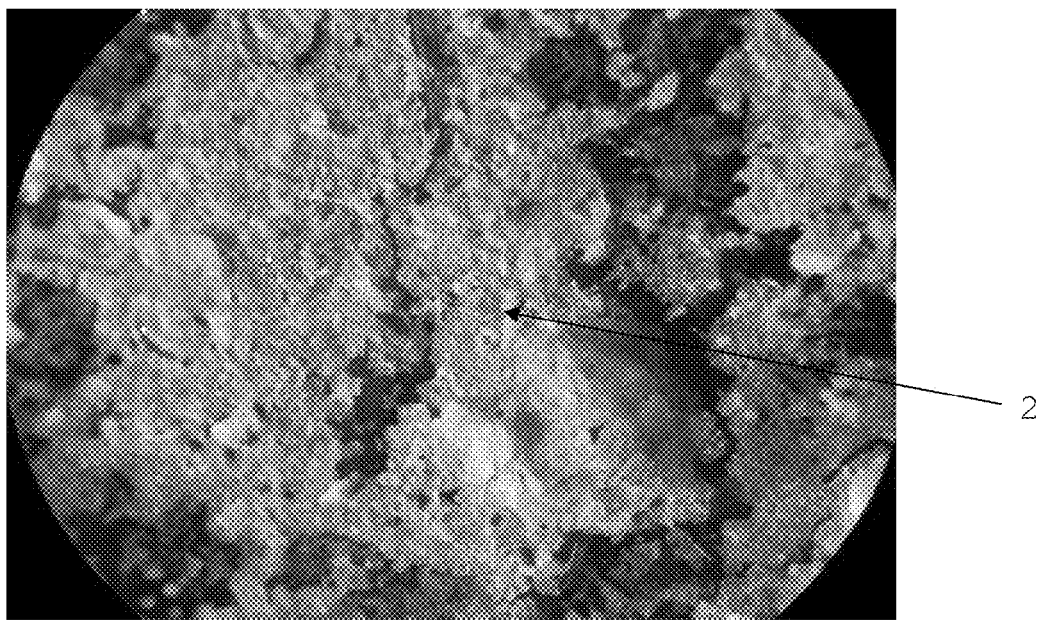
Figure 12:
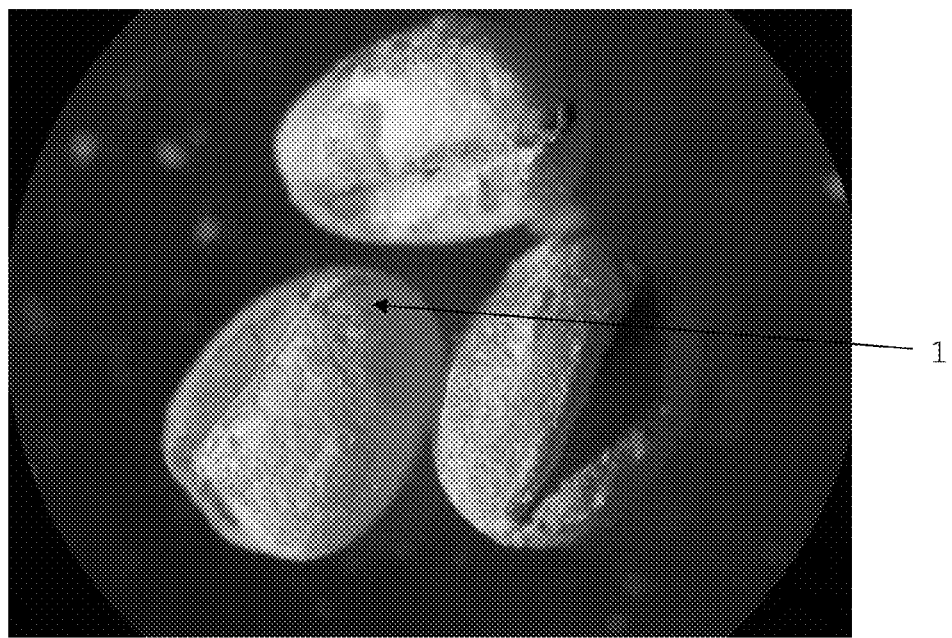
Figure 13:
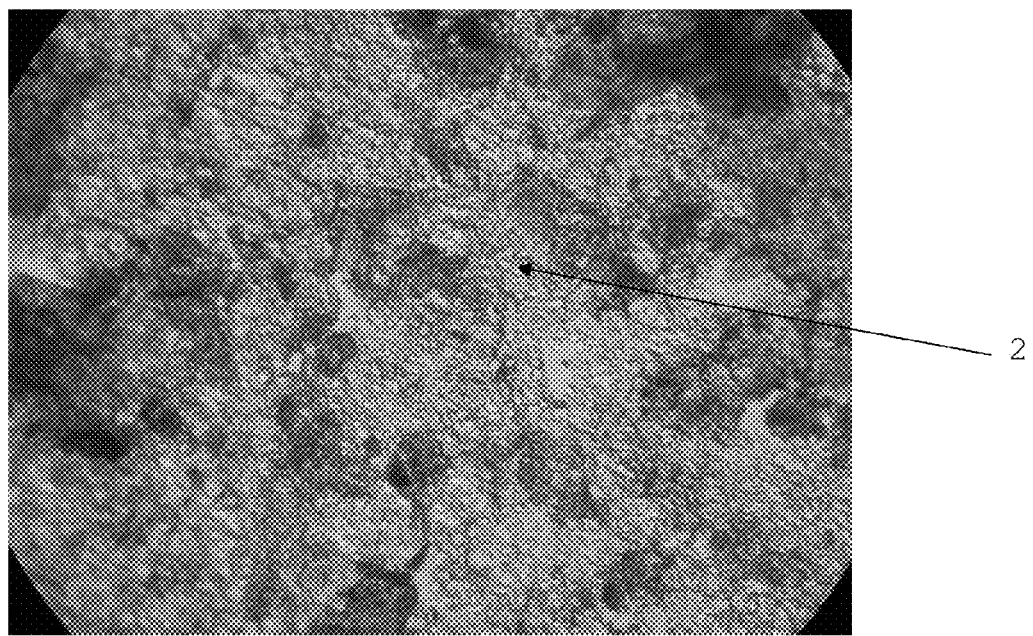
Figure 14:
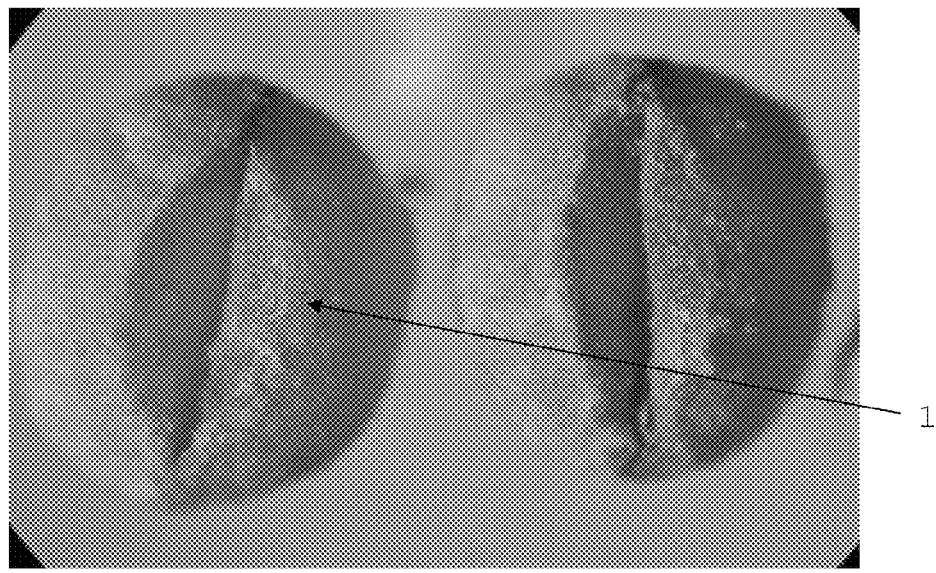
Figure 15:
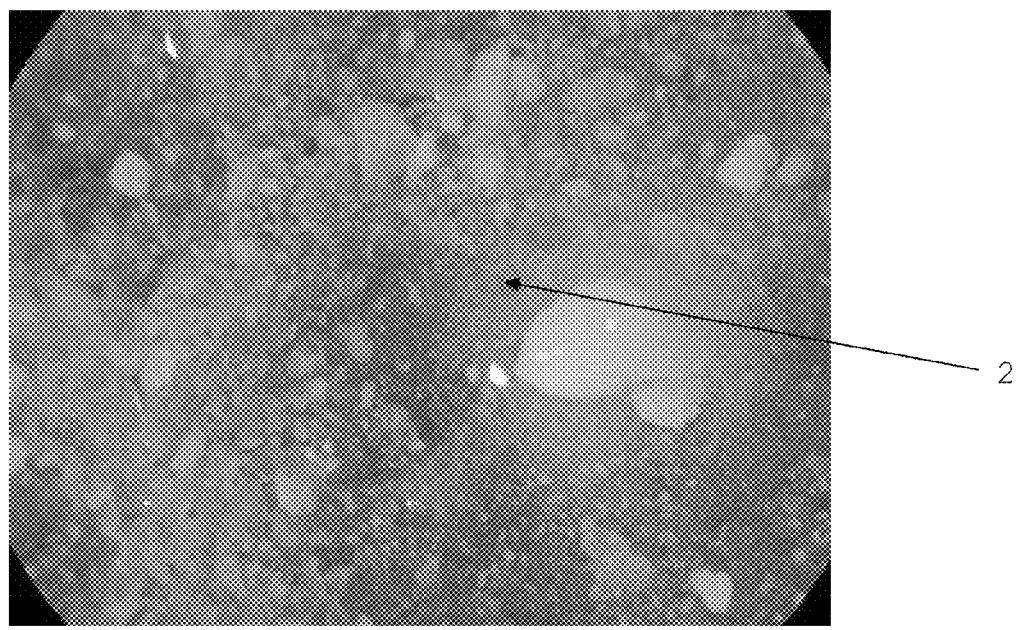
Figure 16:
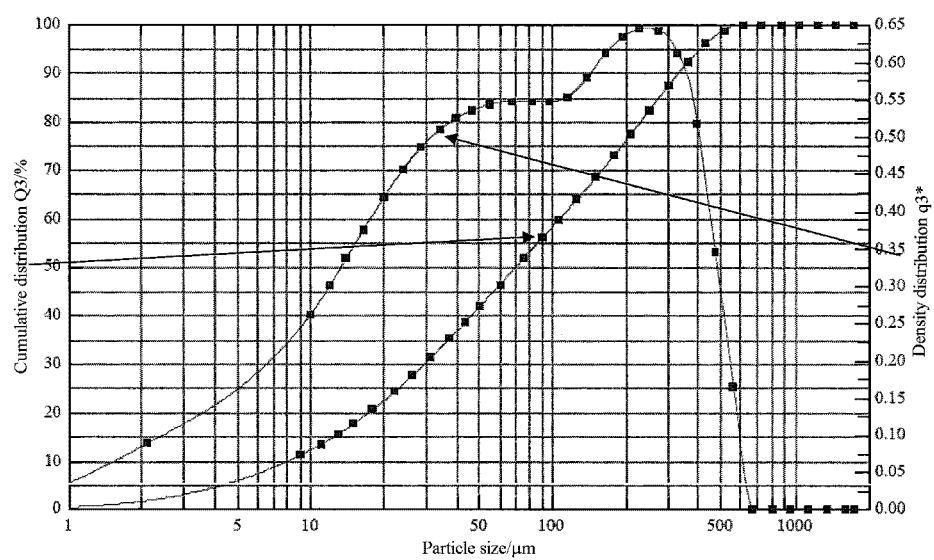

The invention will be described hereinafter with reference to exemplary embodiments and figures, without the subject matter of the invention being restricted to these embodiments. In the figures:

FIG. 1: shows a flow diagram of one variant for carrying out the process;

FIG. 2: shows wheat grain after removal of an outer layer of 0.22% by weight of the original grain;

FIG. 3: shows removed outer layer of the wheat grain as per FIG. 2;

FIG. 4: shows wheat grain after removal of an outer layer of 5% by weight of the original grain;

FIG. 5: shows removed outer layer of the wheat grain as per FIG. 4;

FIG. 6: shows wheat grain after removal of an outer layer of 10% by weight of the original grain;

FIG. 7: shows removed outer layer of the wheat grain as per FIG. 6;

FIG. 8: shows wheat grain after removal of an outer layer of 15% by weight of the original grain;

FIG. 9: shows removed outer layer of the wheat grain as per FIG. 8;

FIG. 10: shows wheat grain after removal of an outer layer of 20% by weight of the original grain;

FIG. 11: shows removed outer layer of the wheat grain as per FIG. 10;

FIG. 12: shows wheat grain after removal of an outer layer of 25% by weight of the original grain;

FIG. 13: shows removed outer layer of the wheat grain as per FIG. 12;

FIG. 14: shows wheat grain after removal of an outer layer of 30% by weight of the original grain;

FIG. 15: shows removed outer layer of the wheat grain as per FIG. 14;

FIG. 16: show size distribution of the particles of the removed outer layer at a degree of removal of 20%;

In the flow diagram in FIG. 1 of one variant for carrying out the process, wheat grains 1 in the untreated state are conveyed into a decontamination device 40 for at least partial elimination, i.e. a reduction, of environmental poisons and/or impurities which can be found on the wheat grains 1 and/or in an outermost layer. A sieving out or picking out of foreign particles (not shown here) can optionally proceed before conveyance into the decontamination device 40.

After the decontamination, here carried out as a mechanical elimination of the outermost layer (also termed light peeling) by means of a light peeling system, for example available from Bühler, the decontaminated grain 1 is conveyed into a device for removal 10. Such a device is available, for example, from Bühler under the name "Vertikalschleifer BSPB" [BSPB vertical pearler], which is also called a pearler. This device for removal 10 is adjustable in such a manner that a degree of removal (also termed degree of peeling) can be set. For example, setting a degree of removal of 5% by weight, 10% by weight, 20% by weight, or else other degrees of removal is possible, depending on the residence time of the wheat grains in the device for removal 10. Further parameters for setting the degree of removal in the device for removal 10 are: design of impact plates in the device 10, grit sizes, amount of material, sieving type and sieve setting, air quantity and air speed.

In the present variant, a degree of removal of 20% by weight was set. Micrographs of correspondingly treated grains 1 and also of the removed outer layer are shown in FIGS. 10 and 11.

The degree of removal of, for example, 20% by weight must be understood only as a mean value over all wheat grains 1. Individual wheat grains 1 can also have a higher or lower degree of removal. This applies to all statements with respect to the percentage degree of removal which are made hereinafter in the individual figures.

Subsequently, the comminuted removed outer layer 2 and the grain 1 are conveyed into the milling device 30 by means of the conveying device 20 which here is constructed as a fall pipe. The comminuted removed outer layer 2 and the grain 1 are conveyed by gravity into the milling device 30.

The milling device 30 is constructed as a roller mill known from the prior art, such as is obtainable, for example, under the name "Antares" from Bühler.

The milling device 30 is arranged according to a milling diagram to a person skilled in the art for whole grain production according to the invention.

In the milling device 30 the comminuted removed outer layer 2 and the grain 1 are milled to whole grain flour 3.

In FIG. 2, a wheat grain 1 is shown, from which an outermost layer has been removed mechanically by a decontamination device which is not shown. In this case, about 0.22% by weight of the wheat grain 1 was removed.

In FIG. 3, a micrograph of the outermost layer removed from the wheat grain as per FIG. 2 is shown which contains, for example, small amounts of starch and other components such as, e.g., small hairs customarily situated on the exterior of the wheat grain which were detached in the decontamination process.

In FIG. 4, a wheat grain 1 is shown, from which about 5% by weight of the wheat grain 1 has been removed in a device, which is not shown, for removing the outer layer. By means of the removal that has been performed, at least in part some of the endosperm has already been removed.

In FIG. 5, a micrograph of at least a detail of the outer layer 2 removed from the wheat grain as per FIG. 4 is shown. This outer layer has an ash content of 3.9% based on the dry matter, a water fraction of 9.9%, a content of total dietary fibers of 54.4% and a starch fraction of 18.2% by weight.

In FIG. 6, a wheat grain 1 is shown from which about 10% by weight of the wheat grain 1 has been removed in a device, which is not shown, for removing the outer layer. A rougher surface of the wheat grain 1 compared with the removal up to 5% is achieved thereby. In addition, starch deposits are visible.

In FIG. 7, a micrograph of at least a detail of the outer layer 2 removed from the wheat grain as per FIG. 6 is shown. This outer layer has an ash content of 4.16% based on the dry matter, a water fraction of 9.9%, a content of total dietary fibers of 42.9%, and a starch fraction of 24.5% by weight.

In FIG. 8, a wheat grain 1 is shown, from which about 15% by weight of the wheat grain 1 has been removed in a device, which is not shown, for removing the outer layer. Substantially all of the outer layers except for the endosperm are removed thereby. In addition, the wheat grains 1 are already broken in a substantial number, and so what is termed broken wheat grains are formed.

In FIG. 9, a micrograph of at least a detail of the outer layer 2 removed from the wheat grain as per FIG. 8 is shown. This outer layer has an ash content of 3.98% based on the dry matter, a water fraction of 9.8%, a content of total dietary fibers of 35.4% and a starch fraction of 31.2% by weight.

In FIG. 10, a wheat grain 1 is shown, from which about 20% by weight of the wheat grain 1 has been removed in a device which is not shown for removing the outer layer. The fraction of wheat grains 1 which are already broken by the removal of the outer layer, i.e. the formation of broken wheat grains, is significantly increased compared with a degree of removal of 15% by weight.

In FIG. 11, a micrograph of at least a detail of the outer layer removed from the wheat grain as per FIG. 10 is shown. This outer layer has an ash content of 3.87% based on the dry matter, a water fraction of 9.8%, a content of total dietary fibers of 31.7%, and a starch fraction of 34.1% by weight.

The particle size distribution of the removed outer layer 2 shown here is shown in FIG. 16.

In FIG. 12, a wheat grain 1 is shown, from which about 25% by weight of the wheat grain 1 has been removed in a device which is not shown for removing the outer layer. The fraction of wheat grains 1 which are already broken by the removal of the outer layer, i.e. the formation of broken wheat grains, is further increased compared with a degree of removal of 20% by weight.

In FIG. 13, a micrograph of at least a detail of the outer layer 2 removed from the wheat grain as per FIG. 12 is shown. This outer layer has an ash content of 3.65% based on the dry matter, a water fraction of 9.8%, a content of total dietary fibers of 28.7%, and a starch fraction of 38.8% by weight.

In FIG. 14, a wheat grain 1 is shown, from which about 30% by weight of the wheat grain 1 has been removed in a device, which is not shown, for removing the outer layer. The fraction of wheat grains 1 which are already broken by the removal of the outer layer is similar to a degree of removal of 25% by weight.

In FIG. 15, a micrograph of at least a detail of the outer layer 2 removed from the wheat grain as per FIG. 14 is shown. This outer layer has an ash content of 3.51% based on the dry matter, a water fraction of 9.7%, a content of total dietary fibers of 25.3%, and a starch fraction of 40.8% by weight.

In FIG. 16, the particle size distribution of the removed outer layer is shown for a degree of removal of 20% by weight. This depiction is based on the following data for the cumulative distribution:

| Particle size [μm] | Cumulative distribution [%] |
|---|---|
| 9 | 11.01 |
| 11 | 13.29 |
| 13 | 15.47 |
| 15 | 17.56 |
| 18 | 20.52 |
| 22 | 24.16 |
| 26 | 27.47 |
| 31 | 31.17 |
| 37 | 35.07 |
| 43 | 38.49 |
| 50 | 41.99 |
| 60 | 46.29 |
| 75 | 51.58 |
| 90 | 55.91 |
| 105 | 59.57 |
| 125 | 63.75 |
| 150 | 68.32 |
| 180 | 73.16 |
| 210 | 77.4 |
| 250 | 82.28 |
| 300 | 87.36 |
| 360 | 92.19 |
| 430 | 96.18 |
| 510 | 98.73 |
| 610 | 100 |
| 730 | 100 |
| 870 | 100 |
| 1030 | 100 |
| 1230 | 100 |
| 1470 | 100 |
| 1750 | 100 |

The density distribution $q_3$ shown in FIG. 16 results in a known manner from the cumulative distribution $Q_3$.

It follows therefrom that 10% of the particles have a size less than $x_{10}=8.2$ μm, 16% of the particles have a size less than $x_{16}=13.5$ μm, 50% of the particles have a size $x_{50}=70.5$ μm, 84% of the particles have a size less than $x_{84}=267$ μm, 90% of the particles have a size less than $x_{90}=332.8$ μm and 99% of the particles have a size less than $x_{99}=531.4$ μm.

The specific surface area has a value of $S_V=0.25$ m$^2$/cm$^3$.

The invention claimed is:

1. A process for producing whole grain flour from cereal, comprising the following steps:
    removing an outer layer of at least one grain, wherein said grain includes an outer bran layer and an endosperm, said removing step including removing said outer bran layer and a portion of said endosperm, leaving a residual portion of the grain, wherein 5% to 40% by weight of the grain is removed, and wherein the removed outer bran layer and endosperm portion is comminuted during the removal of the outer bran layer and endosperm portion;
    conveying the comminuted removed outer bran layer and endosperm portion and the residual portion of the grain into a milling device;
    milling a mixture of the comminuted outer bran layer, endosperm portion, and the residual portion of the grain in the milling device to form whole grain flour.

2. The process as claimed in claim 1, wherein, before the removal of the outer bran layer of the grain, the grain is decontaminated.

3. The process as claimed in claim 2, wherein the grain is decontaminated by mechanical elimination of at least some of an outermost layer of the grain.

4. The process as claimed in claim 1, wherein the removed outer layer of the grain has a starch fraction of greater than 15% by weight.

5. The process as claimed in claim 1, wherein the removed outer bran layer and endosperm portion has a content of total dietary fiber of less than 55%.

6. The process as claimed in claim 1, wherein the removed outer bran layer and endosperm portion has a content of total dietary fiber of greater than 0.2%.

7. The process as claimed in claim 1, wherein the untreated grain has a water fraction in the range from 9% to 15%.

8. The process as claimed in claim 7, wherein, after the step of removing and comminuting the outer bran layer and endosperm portion, this comminuted outer bran layer and endosperm portion has a mean value of the particle size distribution in the range from 45 μm to 220 μm.

9. The process as claimed in claim 8, wherein, after the step of removing and comminuting the outer bran layer and endosperm portion, 99% of the particles of this comminuted outer bran layer and endosperm portion have a size in the range from 10 μm to 850 μm.

10. The process as claimed in claim 9, wherein, after the step of removing and comminuting the outer bran layer and endosperm portion, between 0.5% and 25% by weight of the grain, is separated from the rest of the outer bran layer, endosperm portion and residual portion of the grain, whereby properties of the whole grain flour are adjusted.

11. A whole grain flour-production system comprising in a product flow direction:
    a bran removing and comminuting device which removes an outer layer of a cereal grain, leaving a residual portion of the grain, and which comminutes the removed outer layer during the removal thereof, wherein said cereal grain includes an outer bran layer and an endosperm, and wherein said outer layer consists of components comprising said outer bran layer and a portion of said endosperm, and wherein said bran removing an comminuting device is configured so as to remove 5% to 40% by weight of the cereal grain;
    a conveying device for conveying the removed outer bran layer, the endosperm portion and also the residual portion of the grain; and
    a milling device for milling a mixture of the removed outer bran layer, the endosperm portion and the residual portion of the grain to form whole grain flour;
    wherein the system is constructed in such a manner that, before milling to form whole grain flour, no separation of the components of the comminuted removed outer layer is provided.

12. The system as claimed in claim 11, wherein a decontamination device is connected upstream of the bran removing and comminuting device.

13. The use of a whole grain flour-production system for producing whole grain flour from cereal which system comprises the following components, in a product flow direction:
    a bran removing and comminuting device for removing an outer layer of a cereal grain, leaving a residual portion of the grain, and for comminuting the outer bran layer and the endosperm portion during the removal thereof,
    a conveying device for conveying the comminuted removed outer bran layer and endosperm portion and the residual portion of the grain, and
    a milling device for milling a mixture of the comminuted removed outer bran layer, endosperm portion and the residual portion of the grain,
    wherein the system is constructed in such a manner that, upstream of the milling device, there is no separation of components of the comminuted removed outer bran layer and endosperm portion.

14. The use as claimed in claim 13, wherein no appliance for separating the removed outer bran layer and endosperm portion is provided in the system.

* * * * *